US010217445B2

(12) United States Patent
Rovner et al.

(10) Patent No.: US 10,217,445 B2
(45) Date of Patent: Feb. 26, 2019

(54) MOUTHPIECE FOR WOODWIND INSTRUMENTS WITH CHAMFERED VENTURI APERTURE

(71) Applicant: ROVNER PRODUCTS INCORPORATED, Timonium, MD (US)

(72) Inventors: Philip Lee Rovner, Timonium, MD (US); George Reeder, Reisterstown, MD (US)

(73) Assignee: ROVNER PRODUCTS INCORPORATED, Lutherville-Timonium, MD (US)

( * ) Notice: Subject to any disclaimer, the term of this patent is extended or adjusted under 35 U.S.C. 154(b) by 0 days.

(21) Appl. No.: 15/838,600

(22) Filed: Dec. 12, 2017

(65) Prior Publication Data

US 2018/0166050 A1 Jun. 14, 2018

Related U.S. Application Data

(60) Provisional application No. 62/433,460, filed on Dec. 13, 2016.

(51) Int. Cl.
*G01D 9/02* (2006.01)
*G10D 9/02* (2006.01)

(52) U.S. Cl.
CPC .................................... *G10D 9/02* (2013.01)

(58) Field of Classification Search
CPC ...................................................... G10D 9/02
See application file for complete search history.

(56) References Cited

U.S. PATENT DOCUMENTS

| | | | |
|---|---|---|---|
| 1,667,836 | A | 5/1928 | Brockman, Jr. |
| 1,771,157 | A | 7/1930 | Paul |
| 1,809,380 | A | 6/1931 | Gulick |
| 2,003,576 | A | 6/1935 | Buhren |
| 2,095,605 | A | 10/1937 | Georges |
| 2,181,880 | A | 12/1939 | Fauss |
| 2,224,308 | A | 12/1940 | Maccaferri |
| 2,287,529 | A | 6/1942 | Mario |
| 2,296,737 | A | 9/1942 | Peterson |
| 2,368,556 | A | 1/1945 | Maccaferri |
| 2,411,692 | A | 11/1946 | Murano |
| 2,495,484 | A | 1/1950 | Schemenauer |
| 2,499,855 | A | 3/1950 | Gamble |
| 2,517,077 | A | 8/1950 | Berry |
| 2,525,523 | A | 10/1950 | Chance |
| 3,150,554 | A | 9/1964 | Leloup |

(Continued)

OTHER PUBLICATIONS

Article excerpts from"Downbeat" and "Clarinet Magazine" discussing the Rovner Barrel, 1979.

(Continued)

*Primary Examiner* — Robert W Horn
(74) *Attorney, Agent, or Firm* — Patent Portfolio Builders PLLC

(57) ABSTRACT

An improved mouthpiece for use with single reed woodwind instruments is provided. The transition from the top surfaces of the side rails to the exterior of the mouthpiece includes a chamfer extending along a portion of each side rail to achieve a venturi effect between the top surfaces and the reed at the region of the tone chamber adjacent the tip rail.

20 Claims, 5 Drawing Sheets

(56) References Cited

U.S. PATENT DOCUMENTS

| | | | | |
|---|---|---|---|---|
| 3,433,113 | A | 3/1969 | Portnoy | |
| 3,521,517 | A | 7/1970 | Sato | |
| 3,759,132 | A | 9/1973 | Backus | |
| 3,905,268 | A | 9/1975 | Gamble | |
| 4,056,997 | A | 11/1977 | Rovner | |
| 4,210,055 | A | 7/1980 | Platamone, Jr. | |
| 4,308,781 | A | 1/1982 | McGuerty | |
| 4,337,683 | A | 7/1982 | Backus | |
| 4,428,271 | A | 1/1984 | Winslow et al. | |
| 4,449,439 | A * | 5/1984 | Wells | G10D 9/02 84/383 R |
| 4,517,875 | A | 5/1985 | Dossekker | |
| 4,651,616 | A | 3/1987 | Visser | |
| 4,669,352 | A | 6/1987 | Bichon | |
| 4,708,182 | A | 11/1987 | Laker | |
| 4,745,838 | A | 5/1988 | Johnson | |
| 4,941,385 | A | 7/1990 | Johnson | |
| 5,018,425 | A | 5/1991 | Rovner | |
| 5,105,701 | A | 4/1992 | Hall et al. | |
| 5,192,821 | A | 3/1993 | Goldstein et al. | |
| 5,289,752 | A | 3/1994 | Barbaglia | |
| 5,293,805 | A | 3/1994 | Guardala et al. | |
| 5,303,628 | A | 4/1994 | Salazar | |
| 5,357,837 | A | 10/1994 | Disera | |
| 5,398,582 | A | 3/1995 | Smith | |
| 5,419,229 | A | 5/1995 | Van Doren | |
| 5,456,152 | A | 10/1995 | Cusack et al. | |
| 5,623,111 | A | 4/1997 | Van Doren et al. | |
| 5,728,957 | A | 3/1998 | Valtchev | |
| D404,755 | S | 1/1999 | Garbuzov | |
| 5,973,245 | A | 10/1999 | Van Doren | |
| 5,998,715 | A | 12/1999 | Rovner | |
| 6,020,545 | A | 2/2000 | Consoli | |
| 6,118,060 | A | 9/2000 | Van Doren | |
| 6,130,376 | A | 10/2000 | Chang | |
| 6,150,593 | A | 11/2000 | Holden | |
| 6,259,010 | B1 | 7/2001 | Nagahara | |
| 6,501,010 | B2 | 12/2002 | Sullivan | |
| 6,673,992 | B1 | 1/2004 | Runyon | |
| 7,169,993 | B2 | 1/2007 | Fliegel et al. | |
| 7,326,840 | B2 | 2/2008 | Wanne | |
| 7,465,864 | B2 | 12/2008 | Heintz | |
| 7,470,844 | B2 | 12/2008 | Espina | |
| 7,626,105 | B2 | 12/2009 | Rovner | |
| 7,635,287 | B2 | 12/2009 | May | |
| 7,638,700 | B1 | 12/2009 | Heintz | |
| 7,667,118 | B1 | 2/2010 | Behn | |
| 7,825,317 | B1 | 11/2010 | Lederman et al. | |
| 7,863,509 | B2 | 1/2011 | Rovner | |
| 7,939,738 | B2 | 5/2011 | Rovner | |
| 7,982,112 | B2 | 7/2011 | Rovner | |
| 8,283,541 | B2 | 10/2012 | Rovner | |
| 8,410,344 | B2 | 4/2013 | Rovner | |
| 8,586,845 | B2 | 11/2013 | Rovner | |
| 8,841,529 | B2 | 9/2014 | Rovner | |
| 2004/0011183 | A1 | 1/2004 | Fliegel et al. | |
| 2005/0061136 | A1 | 3/2005 | Rovner | |
| 2005/0061137 | A1 | 3/2005 | Rovner | |
| 2005/0072623 | A1 | 4/2005 | Rovner | |
| 2005/0087057 | A1 * | 4/2005 | Taillard | G10D 9/023 84/383 R |
| 2006/0123973 | A1 | 6/2006 | Espina | |
| 2006/0272473 | A1 | 12/2006 | Kuo | |
| 2008/0022839 | A1 | 1/2008 | Sullivan | |
| 2009/0217798 | A1 | 9/2009 | Rovner | |
| 2009/0217800 | A1 | 9/2009 | Rovner | |
| 2010/0043621 | A1 | 2/2010 | Rovner | |
| 2011/0162508 | A1 | 7/2011 | Rovner | |
| 2011/0239843 | A1 | 10/2011 | Brockman | |
| 2018/0166050 | A1 * | 6/2018 | Rovner | G10D 9/02 |

OTHER PUBLICATIONS

Passband, http://www.absoluteastronomy.com/topics/Passband viewed May 14, 2010.

Rovner ligatures, viewed May 14, 2010 at www.rovnerproducts.com/ligatures.com.

* cited by examiner

MOUTHPIECE FOR WOODWIND INSTRUMENTS WITH CHAMFERED VENTURI APERTURE

CROSS-REFERENCE TO RELATED APPLICATIONS

The present application claims priority to U.S. Provisional Patent Application No. 62/433,460 filed Dec. 13, 2016, the entire contents of which is incorporated herein by reference.

FIELD OF THE INVENTION

The present invention relates to woodwind instruments and in particular to mouthpieces for woodwind instruments.

BACKGROUND OF THE INVENTION

Woodwind musical instruments, e.g., saxophones and clarinets, and other devices such as bird calls, utilize the vibration of a reed in response to a flow of air to generate a tone. These reeds include natural cane reeds and synthetic reeds. Tone generation in general depends on proper reed vibration. The reed is typically placed in contact with a mouthpiece to cover an opening or window. The reed is held in place by an adjustable clamp or ligature that surrounds the mouthpiece and the reed. Variations in the mouthpiece and ligature affect the vibration of the reed and, therefore, the performance or tone of the device or instrument.

An essential function of the mouthpiece of a woodwind instrument is to provide support for the reed over an aperture that allows the reed to vibrate and to direct the energy from reed vibration through the aperture and into the bore of the instrument. The function and performance of a mouthpiece is influenced by the arrangement and geometry of the facing around the aperture as well as tone chamber below the reed, which defines the route from the aperture to the bore. The facing is conventionally a flat surface on the mouthpiece surrounding the aperture, and the reed is placed in contact with this flat surface, covering the aperture. The facing includes the aperture, called a window, and the window is surrounded by a table on one end, two side rails extending from the table and a tip rail opposite the table. The reed functions as a reed valve during vibration, opening and closing the window.

In conventional mouthpieces, the reed is affixed tightly against the flat portion of the facing to secure the mounting of the reed and to affect an airtight seal of the reed with the mouthpiece. In addition, the top surfaces of the side rails that are in contact with the reed are flat. The tone chamber is conventionally formed as a rectangular box having straight interior walls and a flat generally rectangular bottom surface. The transitions from the top surfaces to the interior walls and from the interior walls to the bottom surface are right angles.

In a conventional single-reed mouthpiece, the surface geometry of the mouthpiece at the inlet of the aperture between the reed and the mouthpiece rails is not conducive to enabling an efficient flow of air through the aperture during the negative-pressure portion of the oscillatory cycle. This restriction of airflow effects a damping of the oscillation, thereby reducing the resonance (Q) of the system. The effect on performance is to reduce the accuracy of intonation, tonal quality, and playability.

SUMMARY OF THE INVENTION

The present invention is directed to mouthpieces yielding increased performance in woodwind instruments through improvements in the interface between the reed and the mouthpiece. These improvements include modification to the shape of the portions of the side and tip rails, i.e., the top surfaces, that are in contact with the reed or are adjacent the reed. Contouring the top surfaces of the side and tip rails to induce a smoother airflow during that period of the oscillatory cycle when the reed is about to complete the closure of the window significantly improves performance of the mouthpiece. The tops of the side rails are modified to include a chamfer or beveled edge so that the reed is not in contact with the side rails along the entire length of the side rails or is not in contact with the entire width of each side rail along the entire length of the side rails. These shape modifications improve energy flow through the apertures between the side rails and the reed, improve the coupling of the reed to the air column in the tone chamber and intensify the harmonic content of the tone produced by the mouthpiece.

In accordance with one exemplary embodiment, a woodwind mouthpiece contains a central bore passing through the mouthpiece and a tone chamber in communication with the central bore and having a bottom surface. A window, i.e., an opening, is provided to expose the tone chamber. The mouthpiece includes a table at one end of the window and a pair of side rails extending along opposite sides of the window from the table. Each side rail includes a side rail top surface and an interior surface, i.e., interior to the tone chamber, running from the top surface of the side rail to the bottom surface of the tone chamber. The mouthpiece also includes a tip rail extending between the side rails at ends of the side rails opposite the table. The tone chamber extends from the tip rail to the central bore. The mouthpiece includes a pair of individual chamfers. Each chamfer is associated with and extends along at least a portion of one of the top rails. Each chamfer intersects the side rail top surface of one of the side rails and the outer surface of the mouthpiece.

Exemplary embodiments improve the airflow through the aperture defined between the bottom of the reed and each top rail using a modification of the shape or geometry of the external surface of the mouthpiece at the inlet to the aperture, i.e., extending in from the outer surface of the mouthpiece. With the reed placed over the window and the bottom surface of the reed in contact with or adjacent the table, side rails and tip rail of the mouthpiece, the portion of the tip region of the reed where an aperture is formed extends up to about the first inch of the tip of the mouthpiece. The direction of airflow during the negative-pressure portion of the oscillation of the reed is from the outer surface of the mouthpiece across the tip rail and the side rails and into the window of the tone chamber. Therefore, the interface between the outer surface of the mouthpiece and the top surfaces of the side rails affects the functioning of the aperture. An abrupt geometry is not conducive to enabling an efficient flow of air through the aperture. Therefore, exemplary embodiments form a beveled or sloped surface defining a funnel or venturi inlet that more effectively induces airflow through the aperture during the negative-pressure portion of the oscillatory cycle and that reduces the intensity of the shock front that forms at the inlet of a more abrupt geometry. This reduces damping of the system, resulting in an improvement in overall performance of the mouthpiece.

Exemplary embodiments incorporate a chamfer running along each side rail from the tip rail. Each chamfer is located at the outer corner of the side rail, i.e., at the interface of the outer surface of the mouthpiece and the top surface of each side rail. Since the portion of the reed that functions as the valve is generally limited to no more than about an inch from the tip of the reed, the chamfer preferably extends along only a portion of the entire length of each side rail from the tip rail to the table opposite the tip rail. In one embodiment, this portion is a distance of up to about 1 inch. Alternatively, each chamfer extends along the entire length of the side rail.

Exemplary embodiments are directed to a woodwind mouthpiece having an outer surface and a tone chamber disposed within the outer surface. A window exposes the tone chamber, and a pair of side rails run along opposite sides of the window. Each side rail has a side rail top surface. The mouthpiece includes a pair of chamfers, and each chamfer extends along the one of the side rails and intersects the side rail top surface and the outer surface of the mouthpiece. In one embodiment, each chamfer intersects the side rail top surface at a taper line extending a chamfer length along the side rail. In one embodiment, each side rail has a side rail length, and the chamfer length is less than the side rail length. In one embodiment, the chamfer length is less than about 1 inch.

In one embodiment, each side rail top surface includes an inner edge adjacent the window and an outer edge adjacent the outer surface of the mouthpiece. Each taper line extends from the inner edge to the outer edge. In one embodiment, at least a portion of each taper line extends along a portion of the inner edge. In one embodiment, at least a portion of each taper line is spaced from and is parallel to the inner edge. In one embodiment, the portion of the taper line is spaced from the inner edge by a distance of up to about 1 mm.

In one embodiment, each side rail top surface has an inner edge adjacent the window and an outer edge adjacent the outer surface of the mouthpiece, and at least a portion of each taper line extends along the inner edge. In one embodiment, the mouthpiece includes a tip rail extending between the side rails at an end of the window, and each taper line extends along the top surface of the side rail from a point of intersection of the tip rail and one of the side rails. In one embodiment, the chamfer is a flat surface. In another embodiment, the chamfer is a curved surface. In one embodiment, each side rail has a side rail length, and each chamfer has a chamfer length along the side rail. The chamfer length is less than the side rail length. In one embodiment, the chamfer length is less than about 1 inch. In one embodiment, each chamfer extends from the side rail top surface by an angle of less than 90°. In one embodiment, each chamfer intersects the outer surface along a curved line.

Exemplary embodiments are also directed to a woodwind mouthpiece with an outer surface, a tone chamber disposed within the outer surface, a window exposing the tone chamber, and a pair of side rails running along opposite sides of the window. Each side rail has a side rail top surface, an inner edge adjacent the window and an outer edge adjacent the outer surface of the mouthpiece. The mouthpiece includes a pair of chamfers. Each chamfer is a flat surface extending along the one of the side rails, intersecting the side rail top surface and the outer surface of the mouthpiece at a taper line extending a chamfer length along the side rail and intersecting the outer surface along a curved line. Each taper line extends from the inner edge to the outer edge. In one embodiment, at least a portion of each taper line is spaced from and is parallel to the inner edge. In one embodiment, the chamfer length is less than about 1 inch. In one embodiment, the mouthpiece includes a tip rail extending between the side rails at an end of the window, and each taper line extends along the top surface of the side rail from a point of intersection of the tip rail and one of the side rails.

DETAILED DESCRIPTION

Figure 1:
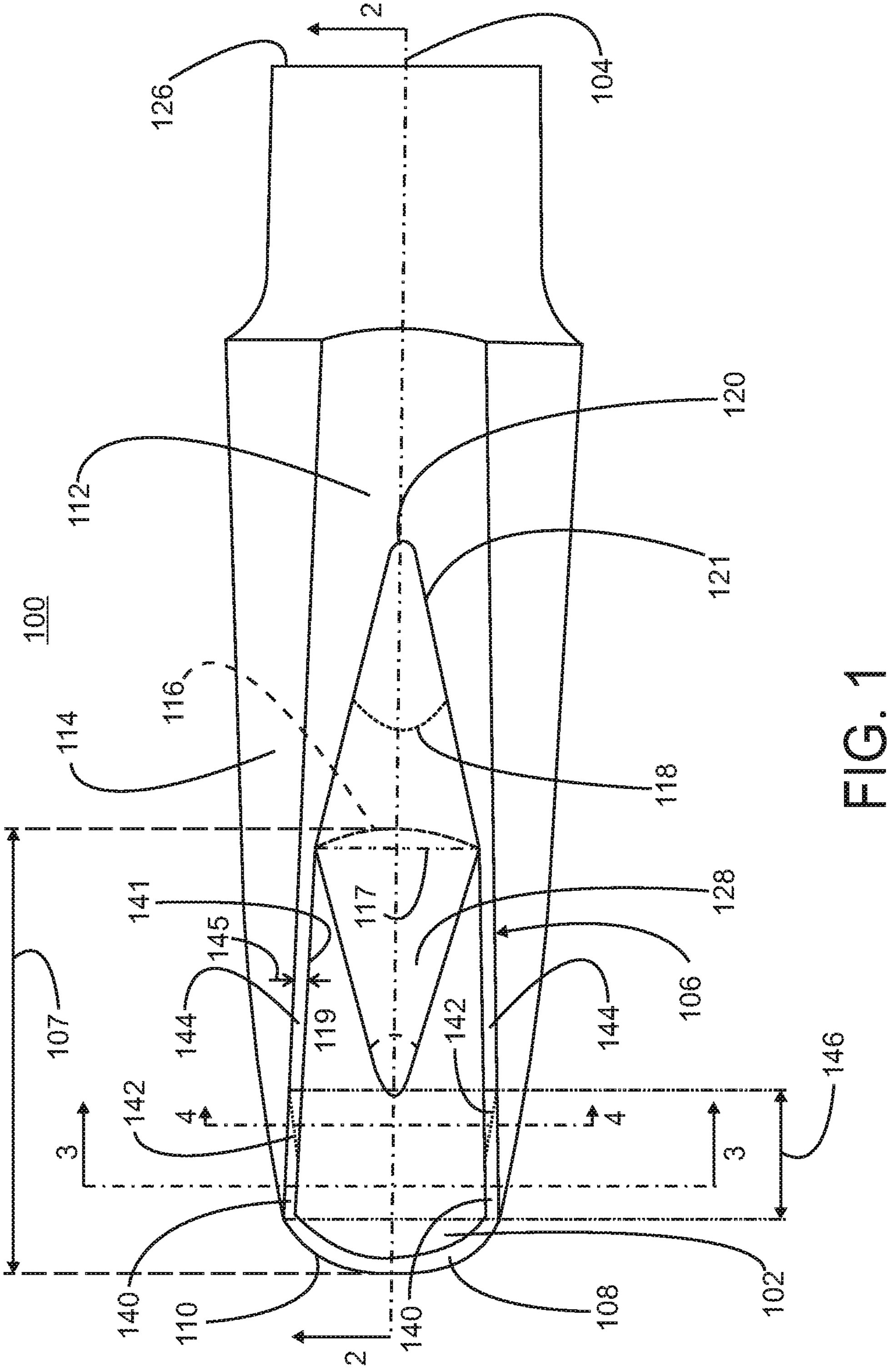
FIG. 1 is a plan view of a bottom side of an embodiment of a mouthpiece in accordance with the present invention.
Figure 2:
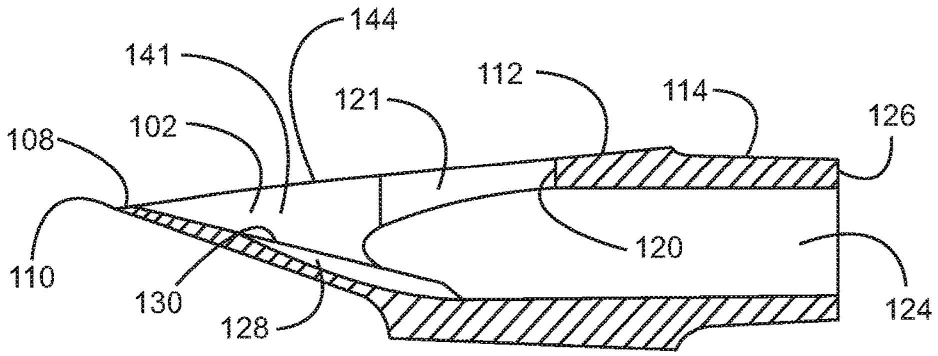
FIG. 2 is a view through line 2-2 of FIG. 1 with the bottom side facing upwards.

Exemplary embodiments are directed to mouthpieces for woodwind musical instruments, e.g., single reed mouthpieces, and other suitable devices in which the venturi effect at the aperture between the mouthpiece window and the reed is manipulated. Referring initially to FIGS. 1 and 2, an exemplary embodiment of a woodwind mouthpiece 100 is illustrated. The woodwind mouthpiece includes a tone chamber 102 disposed within the mouthpiece. Typically, the tone chamber has a generally rectangular cross-sectional shape when view along the central axis 104 of the woodwind mouthpiece. A generally rectangular window 106 exposes the tone chamber. In one embodiment, the window narrows from a tip rail 108 at a first end 110 of the mouthpiece or window to a table end of the window located at the transition between the window and a table 112 that is disposed on an outer surface 114 of the mouthpiece. The table, which is in contact with the window, is configured to engage a reed and, in particular, the heel end of the reed. A ligature (not shown) is placed around the reed and mouthpiece at the table to secure the reed to the mouthpiece. The window transitions to the table at a table end of the window opposite the first end. Conventionally, this transition between the window and the table is straight, i.e., perpendicular to the central axis, or is effectively straight, having only a slight curvature 116.

In one embodiment, the woodwind mouthpiece includes a notch 121 in the table that extends into the table from the window. Preferably, the notch passes completely through the table and can have various shapes such as rectangular, semi-circular, elliptical and u-shaped. Preferably, the notch is a v-shaped notch. In one embodiment, the v-shaped notch is centered on the central axis 104 of the mouthpiece. The notch can also have more complex geometries such as a w-shaped notch or multiple identical notches spanning a width of the table perpendicular to the central axis. In one embodiment, the notch extends into the table to a point 120 that is located at least about 50% along the given length of the table. Preferably, the notch extends into the table from about 50% of the given length to about 60% along the given length. When the notch is a v-shaped notch, the notch defines an angle 118. This angle can be at least about 15 degrees and is preferably at least about 30 degrees. When measured with respect to the central axis 104, the angle is at least about 12.5 degree or preferably at least about 15 degrees. Although illustrated as symmetric with respect to the central axis with the point 120 located on the central axis, the notch can be a-symmetric or could be entirely contained on only one side of the central axis.

As illustrated, the window extends along the mouthpiece from the first end 110 a given length 107, e.g., greater than about 1 inch, for example from about 2 to 3 inches, and is in contact with the table opposite the first end. The mouthpiece includes a central mouthpiece bore 124 passing through the mouthpiece from a second end 126 of the mouthpiece opposite the first end to the tone chamber. In one embodiment, the central mouthpiece bore has a circular cross-section. In one embodiment, the notch extends into the table a distance sufficient to expose at least a portion of this mouthpiece bore. Therefore, the notch extends past the tone chamber portion of the mouthpiece to the central bore portion of the mouthpiece.

In one embodiment, the woodwind mouthpiece includes a groove 128 formed into the bottom surface 130 of the tone chamber 102. This groove has a smooth, curved profile (FIG. 2) along the central axis of the mouthpiece and provides a more gradual transition from the tone chamber 102 to the central bore 124 of the mouthpiece along the bottom surface of the tone chamber. In one embodiment, the tone chamber bottom surface groove is formed with a v-shaped profile when view from the window of the tone chamber (FIG. 1) and has a semi-circular or rounded cross section perpendicular to the central axis of the mouthpiece. In one embodiment, the geometry of the v-shaped profile is similar to the geometry of the v-shaped notch in the table. For example, the v-shaped groove is symmetric along the central axis of the mouthpiece and defines an angle 119 of at least about 15 degrees and preferably at least about 30 degrees. In one embodiment, the v-shaped groove has a profile, when viewed from the window of the tone chamber that is a mirror image of the v-shaped notch in the table along a line 117 perpendicular to the central axis of the mouthpiece. This line defines a transition point from the tone chamber window to the table.

A pair of side rails having side rail top surfaces 144 extend along either side of the window from the tip rail 108 to the table 112. In one embodiment, the tip rail has a flat top surface. In general, each side rail extends along the complete length of the window. Each top surface is configured to engage the bottom surface of the reed that is attached over the window. The top surface of each side rail has a width 145 extending from an inner surface or inner wall 141 of the tone chamber, i.e., an inner edge of the side rail top surface, to the outer surface 114 of the mouthpiece, i.e., an outer edge of the side rail top surface. In general, each top surface is flat or coplanar with the surface of the table. Therefore, contact between the bottom surface of the reed and the mouthpiece extends from the table along each side rail. The inner and outer edges of the side rail top surface are sharp edges. To provide improved air flow between the reed and the top surface of each side rail and into the tone chamber during a negative pressure situation within the tone chamber, the interface between the side rail top surface and the outer surface of the mouthpiece is softened or smoothed.

In one embodiment, each side rail includes at least one chamfer 140 or bevel. Therefore, the mouthpiece includes at least one pair of chamfers. Each chamfer intersects the top surface of the side rail and the outer surface of the mouthpiece. In one embodiment, the chamfer intersects the outer surface along a curved line. Thus, the chamfers provide the desired softening of the interface between the side rail top surface and the outer surface of the mouthpiece. Each chamfer has a chamfer length 146 that extends along only a portion of the overall length of each side rail. In one embodiment, the chamfer length is less than about 1 inch, preferably less than about 0.75 inches. The chamfer intersects the top surface of the side rail at any point from the inner edge of the top rail to the outer edge of the top rail adjacent the outer surface of the mouthpiece. In one embodiment, the chamfer extends along the inner edge of the top rail from the tip rail a portion of the length of the side rail before following a chamfer line or taper line 142 across the width of the side rail to the outer edge of the side rail at the outer surface of the mouthpiece. In one embodiment, at the point that the taper line intersects the outer edge of the side rail, the top surface of the side rail is flat from that point until the table. In one embodiment, the chamfer begins at the point of intersection of the side rail and the tip rail and extends from that point along a portion of the side rail a given chamfer length 146. In one embodiment, the chamfer length is up to about 1 inch. In one embodiment, the chamfer begins along the side rail at a point spaced from the tip rail.

Suitable methods for forming the chamfer include, but are not limited to, sanding or grinding each chamber into each side rail and forming each chamfer as the mouthpiece is molded. Preferably, each chamfer is a flat of planar surface that is not parallel to the inner wall of the tone chamber and intersects the top surface of the side rail at an angle other than 90 degrees. Alternatively, each chamfer can be a convex or concave surface.

Figure 3:
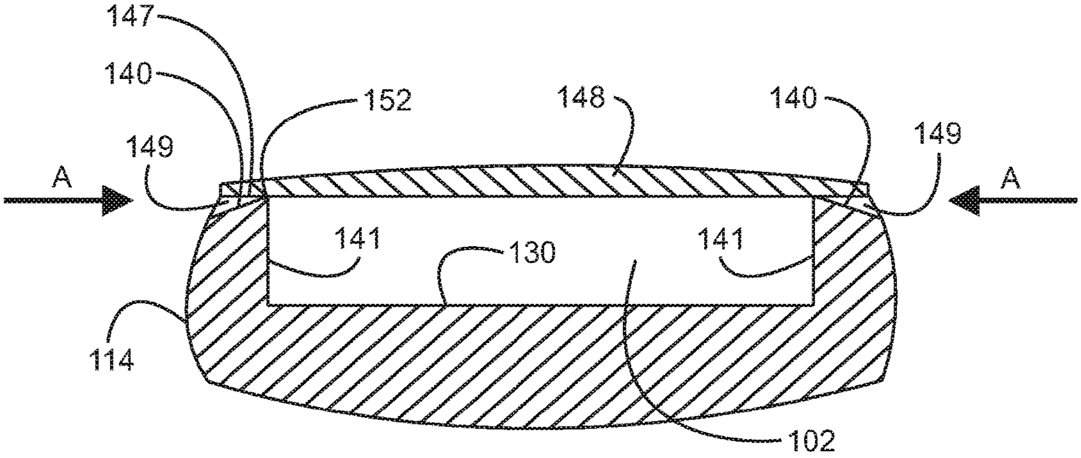
FIG. 3 is a view through line 3-3 of FIG. 1 with the bottom side facing upwards.
Figure 4:
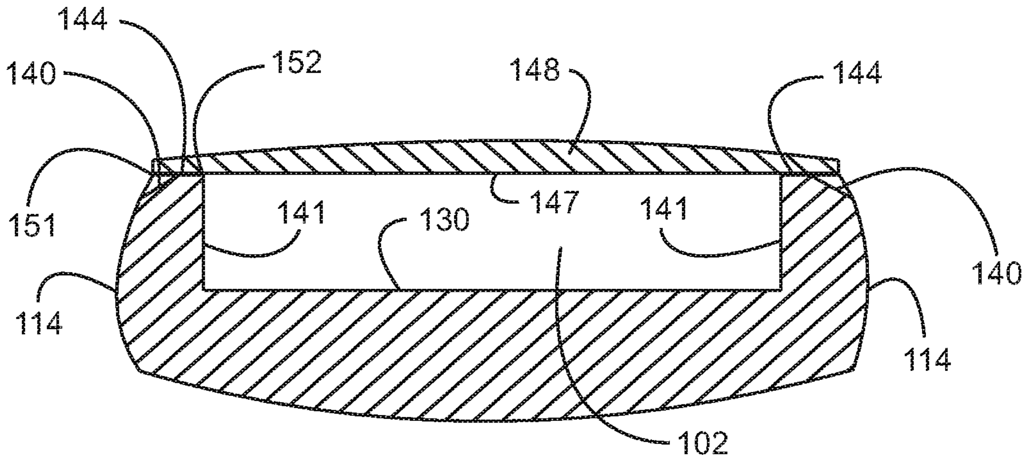
FIG. 4 is a view through line 4-4 of FIG. 1.
Figure 5:
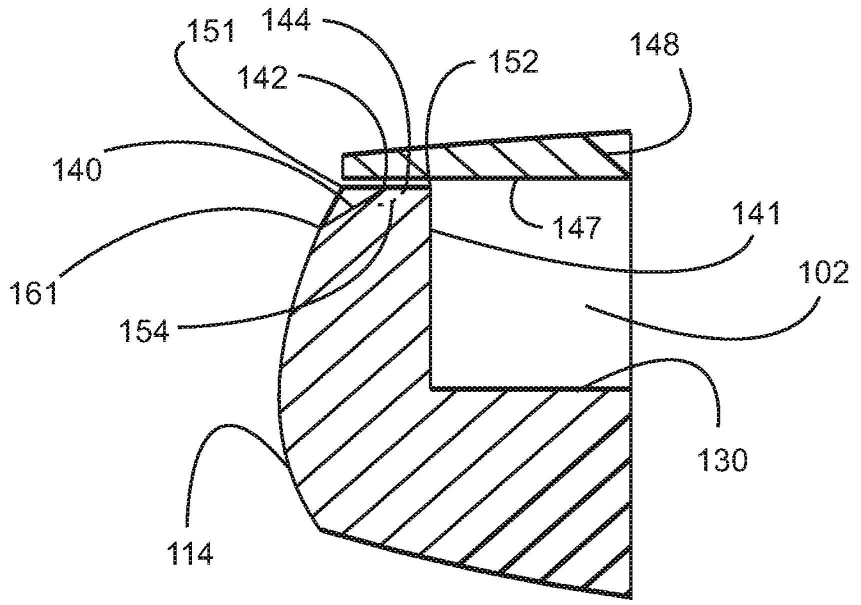
FIG. 5 is a partial view of the view of FIG. 4.

Referring now to FIGS. 3-5, the chamfers 140 form a gap or funnel 149 between the surface of the chamfer 140 and the bottom surface 147 of the reed 148. Therefore, instead of each side rail top surface 144 being in contact with the bottom of the reed from the outer edge 151 to the inner edge 152 of the side rail along the entire length of the side rail, the gap 149 creates a space between the reed and the side rail that extends from the side rail top surface to a line of intersection 161 with the outer surface 114 of the mouthpiece. This gap facilitates the flow of air in the direction indicated by arrow A, from outside the mouthpiece, through the aperture between the top rail and the reed and into the tone chamber 102. The inner edge 152 of each side rail continues to contact with the bottom of the reed along the entire length of each side rail, including that portion of the length containing the chamfer upon closure of the valve formed between the reed and the window. The point of intersection between the chamfer and the top surface of each side rail varies along the length of the chamfer. In addition, the chamfer, being a preferably planar surface, intersects the top surface of each side rail at a given chamfer angle 154. This given angle is not equal to 90 degrees. The chamfer angle can be constant along the chamfer length or can vary along the chamfer length. In one embodiment, each chamfer does not intersect the inner wall of the tone chamber other than at the inner edge of the top surface of the side rail. Therefore, the sharp edge and closure of the valve formed between the reed and the window is maintained.

Figure 6:
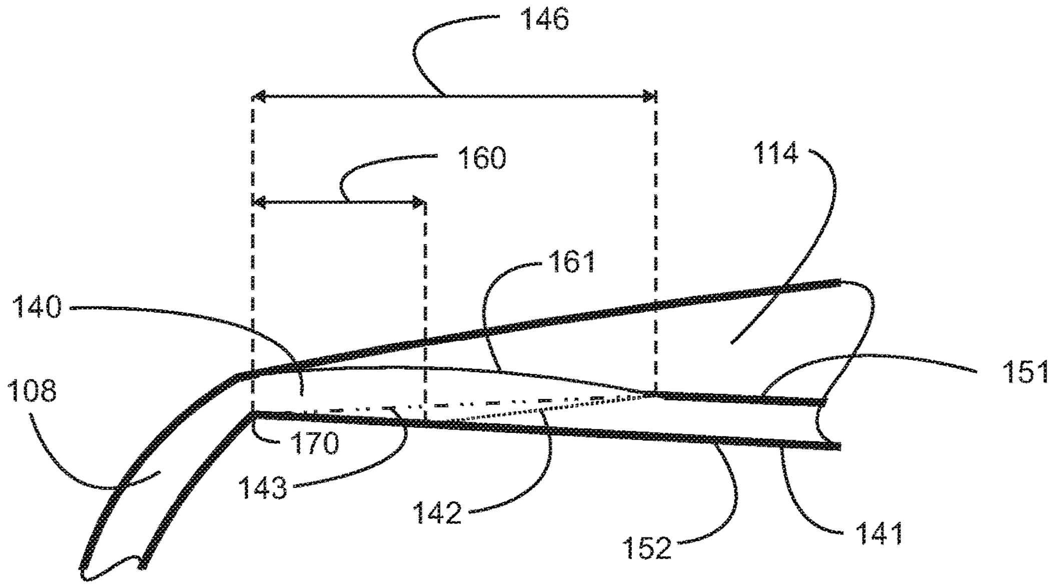
FIG. 6 is a partial view of the side rail showing embodiments of the chamfer.
Figure 7:
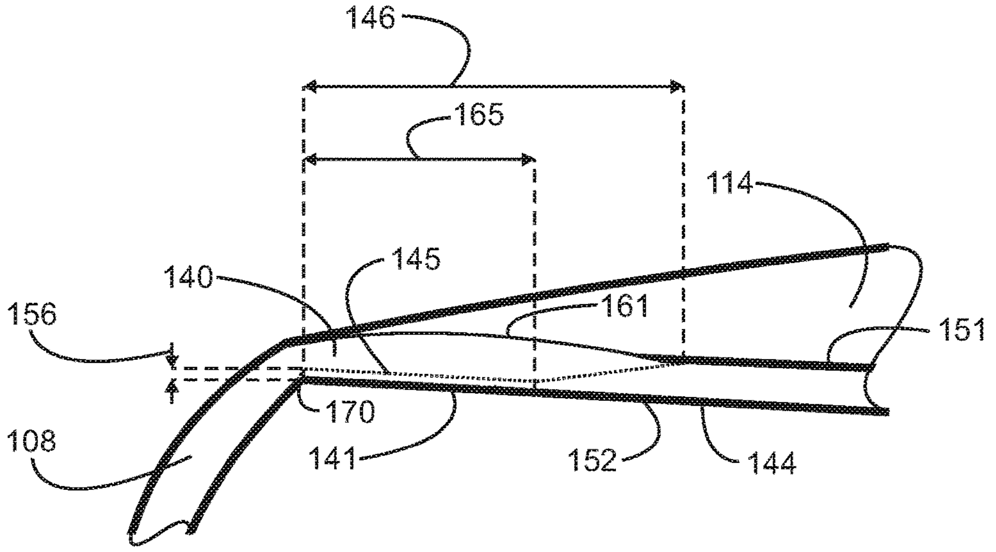
FIG. 7 is a partial view of the side rail showing another embodiment of the chamfer.

Referring to FIGS. 6 and 7, arrangements of the chamfer 140 and the taper line of the chamfer along the side rail are illustrated. While illustrated for one side rail, similar chamfers and taper lines can be included in both side rails. In one embodiment (FIG. 6), the chamfer extends along the inner edge 152 of the side rail top surface a given initial distance 160 and then follows a taper line 142 across the width of the side rail to the outer edge 151 of the top surface of the side rail. The initial distance is less than the overall chamfer length 146 measured along the side rail from the tip rail 108. In one embodiment, the initial distance is less than about 0.5 inches or less than about 0.375 inches. In another embodiment, the chamfer begins at the point of intersection 170 between the inner edge of the side rail top surface and the tip rail and follows an alternate taper line 143 from that point of intersection to the outer edge 151 of the side rail top surface at a point located at the chamfer length 146 along the side rail. This alternate taper line does not extend along the inner edge of the side rail top surface.

In another embodiment (FIG. 7), the taper line 145 starts at the intersection between the side rail and the tip rail and parallels the top surface inner edge 152 for an initial distance 165. The taper line then extends at an angle to the inner edge to intersect the top surface outer edge 151 at a point located at the chamfer length 146 along the side rail. While running parallel to the inner edge 152, the taper line 145 is spaced from the inner edge by a given taper line spacing 156. In one embodiment, the taper line spacing is less than or equal to about 1 mm. For each illustrated chamfer embodiment, the outer edge 151 of the side rail top surface is removed along the chamfer length. The chamfer intersects the outer surface 114 of the mouthpiece along the chamfer length. The intersection between the chamfer and the outer surface defines the line of intersection 161 running along the chamfer length. This line of intersection is spaced from the bottom surface of the reed. In addition, as the outer surface of the mouthpiece is rounded or curved, the line of intersection will also follow a curvature corresponding to the contours of the outer surface of the mouthpiece.

Figure 8:
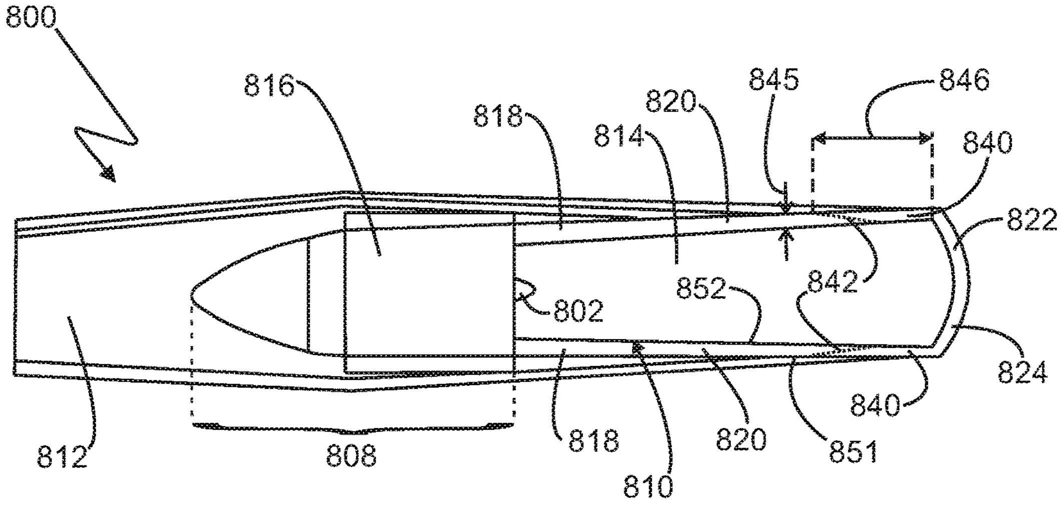
FIG. 8 is a plan view of a bottom side of another embodiment of a mouthpiece in accordance with the present invention.

The chamfer has been illustrated with respect to the clarinet style single reed mouthpiece, which is used in conjunction with the barrel. However, the chamfer can be included in any type of single reed mouthpiece in which the reed covers a window to a tone chamber. Referring now to FIG. 8, an exemplary embodiment of a saxophone style mouthpiece 800 having a rectangular tone chamber and a modified side rail top surface and tip rail in accordance with the present invention is illustrated. In one embodiment, the mouthpiece has a typically elongated or barrel shape that tapers to either end. On a bottom side 812 of the mouthpiece is an elongated window 810 having a generally rectangular shape. The window may be tapered or narrowed at one end or the other. In addition, one end of the window can include a bow or arch to match or compliment the curvature of the end of the reed. The side of the mouthpiece containing the window is considered the bottom side, because that side typically faces down or is on the bottom of the mouthpiece when the mouthpiece is attached to a musical instrument. For purposes of the present description, the mouthpiece is viewed from the bottom.

The window 810 exposes a tone chamber 814 within the mouthpiece. In one embodiment, the tone chamber has a rectangular cross section when view across the side rails of the mouthpiece. The tone chamber is in communication with a central bore 802 passing through the mouthpiece. The central bore is arranged to attach to the woodwind instrument, i.e., the saxophone. In one embodiment, the central bore meets the tone chamber at one end of the window, i.e., the central bore does not extend into the portion of the mouthpiece exposed by the widow. Alternatively, the central bore extends into the portion of the mouthpiece exposed by the window.

In general, the mouthpiece includes a tapered, reduced rear portion that is adapted to fit to the woodwind instrument in a conventional manner. The central bore has a length necessary to telescopically receive a neckpiece of the woodwind instrument. In one embodiment, the central bore is cylindrical. A table 808 is disposed at one end of the window. The table is a flat surface on the bottom side of the mouthpiece and is situated to engage a portion of a reed adjacent the heel end of the reed. This flat surface is the top 816 of the table, and the top engages the portion of the reed adjacent the heel end of the reed. The ligature securing the reed to the mouthpiece surrounds the mouthpiece around the table region of the mouthpiece. In one embodiment, the table has an overall length of about 1.9375" to about 2".

The mouthpiece also includes a pair of side rails 818 running along opposite sides of the window 810. Each side rail 818 frames one side of the window 810. The side rails 818 extend from the table 808. In one embodiment, the side rails extend perpendicularly from the table. Alternatively, the side rails flare outwards as they extend from the table. The side rails are parallel in that the side rails do not cross or intersect in the region of the window. Each side rail includes a side rail top surface 820 running along the length of the side rail. The top surface of each side rail contacts a portion of the reed. In one embodiment, each side rail has a length of about 2" to about 2.125", and each side rail top surface has a width 845 of about 0.0625" to about 0.125 ". In one embodiment, the width of each side rail top surface varies from about 0.125" at the table to about 0.0625" at the other end of the side rail. These dimensions are also suitable for the clarinet style mouthpiece embodiments. In one embodiment, each side rail top surface is coplanar with the table top. Alternatively, each side rail top surface is coplanar with the table top at the point of intersection of the side rail with the table top and subsequently curves away from the plane of the table top in the direction of the top side of the mouthpiece. The top side of the mouthpiece is opposite the bottom side 812. This curvature provides for separation between the reed and the side rail top surfaces at an end of the reed opposite the heel end. This separation occurs, for example, when the reed is attached to the mouthpiece and is not vibrating. Vibration of the reed causes the reed to come into contact with the side rail top surfaces along the entire length of the top rails. The reed in combination with the window acts as a valve for the tone chamber.

The mouthpiece also includes a tip rail 822. The tip rail extends between the side rails at an end of the window opposite the table. In one embodiment, the tip rail extends along a generally straight line between the side rails. Preferably, the tip rail follows an outward arc between the side rails. The tip rail is in contact with the reed when the reed vibrates to close the window in the tone chamber. In one embodiment, the tip rail spans a distance between the side rails of from about 0.625 inches to about 0.75 inches. The shape of the tip rail can be the same as the shape of the tip of the reed or can be an arc having a different curvature than the tip of the reed. The tip rail includes a tip rail top surface 124. In one embodiment, the tip rail has a flat top surface. The tip rail top surface is the portion of the tip rail that comes onto contact with the reed. In one embodiment, the tip rail top surface has a width of up to about 0.0625 inches. In one embodiment, the tip rail top surface is coplanar with the side rail top surfaces at the points of intersection between the side rails and the tip rail.

Each side rail includes a chamfer 840. Therefore, the mouthpiece includes a pair of chamfers. The chamfer intersects the top surface of the side rail and the outer surface of the mouthpiece. Suitable arrangements and embodiments for the chamfer are discussed herein. In one embodiment, each chamfer extends a chamfer length 846 along only a portion of the overall length of each side rail. In one embodiment, the chamfer length is less than about 1 inch, preferably less than about 0.75 inches. The chamfer intersects the top surface of the side rail at any point from the inner edge 852 of the top rail to the outer edge 851 of the top rail at the outer surface of the mouthpiece. In one embodiment, the chamfer extends along the inner edge and then follows a taper line 842 to the outer surface of the mouthpiece. In one embodiment, once the taper line intersects the outer edge, the top surface of the side rail is flat from that point until the table. In one embodiment, the chamfer begins at the point of intersection of the side rail and the tip rail and extends from that point along the side rail the chamfer length. In one embodiment, the chamfer is spaced from the tip rail.

The chamfer extends at least partially along the top surface of each side rail, from the tip rail toward the table. The portions of the side rail top surface that are not rounded are substantially flat. In one embodiment, each rounded portion of the side rail top surface extends from a point of intersection of that side rail with the tip rail partially along the side rail top surface toward the table. The amount of side rail top surface in contact with the reed is reduced. During the negative pressure portion of the oscillatory cycle of the reed, when the reed is being drawn towards closure, i.e., into contact with the side rail top surfaces, the rounded surfaces effect a venturi, reducing airflow turbulence and resulting in a more liquid, less gritty tonal quality. In addition, an improvement in response, intonation, and tonal size is produced.

The present invention is also directed to methods for making or creating a woodwind mouthpiece that takes advantage of the gap provided at the aperture between the reed and the tone chamber. A tone chamber is formed in the mouthpiece in communication with the central bore. This tone chamber includes a bottom surface and a pair of opposing interior surfaces extending from the bottom surface. A window is formed in the mouthpiece in communication with the tone chamber. This window exposes the tone chamber. In one embodiment, a chamfer is formed to run along a portion of the length of each one of the side rails. Each chamfer intersects the side rail top surface and an outer surface of the mouthpiece.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A woodwind mouthpiece comprising:
- an outer surface;
- a tone chamber disposed within the outer surface;
- a window exposing the tone chamber;
- a pair of side rails running along opposite sides of the window, each side rail comprising a side rail top surface; and
- a pair of chamfers, each chamfer extending along the one of the side rails and intersecting the side rail top surface and the outer surface of the mouthpiece.

2. The woodwind mouthpiece of claim 1, wherein each chamfer intersects the side rail top surface at a taper line extending a chamfer length along the side rail.

3. The woodwind mouthpiece of claim 2, wherein:
- each side rail comprises a side rail length; and
- the chamfer length is less than the side rail length.

4. The woodwind mouthpiece of claim 2, wherein the chamfer length is less than about 1 inch.

5. The woodwind mouthpiece of claim 2, wherein:
- each side rail top surface comprises an inner edge adjacent the window and an outer edge adjacent the outer surface of the mouthpiece; and
- each taper line extends from the inner edge to the outer edge.

6. The woodwind mouthpiece of claim 5, wherein at least a portion of each taper line extends along a portion of the inner edge.

7. The woodwind mouthpiece of claim 5, wherein at least a portion of each taper line is spaced from and is parallel to the inner edge.

8. The woodwind mouthpiece of claim 7, wherein the portion of the taper line is spaced from the inner edge by a distance of up to about 1 mm.

9. The woodwind mouthpiece of claim 2, wherein:
- each side rail top surface comprises an inner edge adjacent the window and an outer edge adjacent the outer surface of the mouthpiece; and
- at least a portion of each taper line extends along the inner edge.

10. The woodwind mouthpiece of claim 2, wherein:
- the mouthpiece comprises a tip rail extending between the side rails at an end of the window; and
- each taper line extends along the top surface of the side rail from a point of intersection of the tip rail and one of the side rails.

11. The woodwind mouthpiece of claim 1, wherein the chamfer comprises a flat surface.

12. The woodwind mouthpiece of claim 1, wherein the chamfer comprises a curved surface.

13. The woodwind mouthpiece of claim 1, wherein:
- each side rail comprises a side rail length;
- each chamfer comprises a chamfer length along the side rail; and
- the chamfer length is less than the side rail length.

14. The woodwind mouthpiece of claim 13, wherein the chamfer length is less than about 1 inch.

15. The woodwind mouthpiece of claim 1, wherein each chamfer extends from the side rail top surface by an angle of less than 90°.

16. The woodwind mouthpiece of claim 1, wherein each chamfer intersects the outer surface along a curved line.

17. A woodwind mouthpiece comprising:
- an outer surface;
- a tone chamber disposed within the outer surface;
- a window exposing the tone chamber;
- a pair of side rails running along opposite sides of the window, each side rail comprising a side rail top surface, an inner edge adjacent the window and an outer edge adjacent the outer surface of the mouthpiece; and
- a pair of chamfers, each chamfer comprising a flat surface extending along the one of the side rails, intersecting the side rail top surface and the outer surface of the mouthpiece at a taper line extending a chamfer length along the side rail and intersecting the outer surface along a curved line, each taper line extending from the inner edge to the outer edge.

18. The woodwind mouthpiece of claim 17, wherein at least a portion of each taper line is spaced from and is parallel to the inner edge.

19. The woodwind mouthpiece of claim 17, wherein the chamfer length is less than about 1 inch.

20. The woodwind mouthpiece of claim 17, wherein:

the mouthpiece comprises a tip rail extending between the side rails at an end of the window; and each taper line extends along the top surface of the side rail from a point of intersection of the tip rail and one of the side rails.

* * * * *